United States Patent [19]
Watanabe

[11] Patent Number: 5,907,359
[45] Date of Patent: May 25, 1999

[54] HIGHLY-INTEGRATED IMAGE SENSING APPARATUS PRODUCING DIGITIZED OUTPUT

[75] Inventor: Tohru Watanabe, Ogaki, Japan

[73] Assignee: Sanyo Electric Co., Ltd., Osaka, Japan

[21] Appl. No.: 08/704,231

[22] Filed: Aug. 27, 1996

[30] Foreign Application Priority Data

Aug. 30, 1995 [JP] Japan .................................. 7-222069

[51] Int. Cl.$^6$ .............................. H04N 3/14; H04N 5/225
[52] U.S. Cl. ........................... 348/372; 348/552; 348/222
[58] Field of Search .................................. 348/207, 222, 348/312, 372, 331, 332, 333, 552, 294, 298; 327/108, 104, 72, 333; 326/80

[56] References Cited

U.S. PATENT DOCUMENTS

| 3,959,665 | 5/1976 | Gilbreath et al. ........................ 326/80 |
| 4,342,928 | 8/1982 | Gschwendtner et al. ................. 326/80 |
| 4,763,154 | 8/1988 | Iguchi et al. ............................. 396/99 |
| 5,115,148 | 5/1992 | Kammerl et al. ......................... 326/80 |
| 5,223,751 | 6/1993 | Simmons et al. ......................... 326/81 |
| 5,436,585 | 7/1995 | DiMarco ................................. 327/333 |
| 5,506,617 | 4/1996 | Parulski et al. ......................... 348/207 |
| 5,515,103 | 5/1996 | Ito .......................................... 348/312 |
| 5,534,812 | 7/1996 | Cao et al. ................................ 327/333 |
| 5,535,011 | 7/1996 | Yamagami et al. ..................... 348/552 |

Primary Examiner—Wendy Garber
Attorney, Agent, or Firm—Sheridan Ross P.C.

[57] ABSTRACT

An image sensing apparatus for sensing an object and for transmitting the image information to a bus line as digitized data. The image sensing apparatus includes a solid state image sensor. The sensor has a plurality of light-receiving elements aligned in a matrix form and stores information charges produced by each light-receiving element in response to received light. A driver provides the solid state image sensor with a clock pulse and causes it to sequentially output the information charges stored in the individual light-receiving elements in accordance with the clock pulse. A signal processor produces image signals in a predetermined format in response to the information charges from the solid state image sensor. An A/D converter quantizes the image signals produced in the signal processor and produces image data corresponding to each light receiving element. An output interface outputs the image data from the A/D converter to the bus line. The output interface operates between a supply voltage and a first ground voltage. The solid state image sensor and the signal processor operate between the supply voltage and a second ground voltage. The second ground voltage has a lower potential than the first ground voltage.

8 Claims, 3 Drawing Sheets

HIGHLY-INTEGRATED IMAGE SENSING APPARATUS PRODUCING DIGITIZED OUTPUT

BACKGROUND OF THE INVENTION

1. Field of the Invention

The present invention relates to an image sensing apparatus for digitizing image information of an original target and transmitting the information to computer systems.

2. Description of the Related Art

Some computer systems like personal computers and word processors are equipped with an image scanner, which scans an original target and reads the target's image information. Recently available are computer systems that include an electronic camera that senses a dynamic image as well as a three-dimensional image. The camera sends image data to the computer via a bus line. Such electronic cameras digitize image information and transmit the digitized data to computer systems.

FIG. 3 is a block diagram showing a conventional image sensing apparatus for digitizing image information and for outputting the digitized data (image data). A solid state image sensor 1 is constituted by a CCD (charge coupled device) having a plurality of light-receiving elements aligned in a matrix form and a plurality of shift registers corresponding to each light-receiving element. The sensor 1 stores information charges at each light-receiving element, which correspond to the image pattern of a subject. A CCD driver 2 produces a multi-phase clock pulse signal based on horizontal and vertical scan timing signals each synchronous with the horizontal and vertical scan timings. The CCD driver 2 provides the CCD 1 with the multi-phase clock pulse signal. This allows the CCD 1 to be driven in accordance the timing pulse based on the horizontal and vertical scan timing signals. The information charges stored in each light-receiving element are sequentially outputted via the corresponding shift register at a predetermined timing. Each information charge packet is converted to a voltage value in an output interface of the CCD 1. Then, sets of image signals, each of which corresponds to a line of light-receiving elements, are continuously outputted line by line.

A timing controller 3 includes a counter and a decoder. The timing controller 3 inputs a reference clock having a given period and produces timing signals of horizontal and vertical scanning period. When pursuant to the NTSC (National Television System Committee) standard, the timing controller 3 inputs a reference clock signal of 14.32 MHz. The timing controller then produces a horizontal timing signal by frequency-dividing the reference clock signal into 1/910 and produces a vertical timing signal by frequency-dividing the produced horizontal timing signal into 2/525.

A signal processor 4 shapes image signals from the CCD 1 into a predetermined format by performing a sample and hold operation, AGC (automatic gain control), etc. to the signals. For example, in the sample and hold operation, a reference level and a signal level are alternately outputted with a predetermined interval in between. Data corresponding to the difference between the reference level and the signal level is acquired as a sample. On the other hand, in the AGC operation, the gain to the image signal is adjusted so that the average level of the image signals on a screen is contained in a proper range.

An A/D converter 5 operates in synchronism with the drive timing of the CCD 1 and quantizes the image signals from the signal processor 4 pixel by pixel for producing digitized image data corresponding to each light-receiving element on the CCD 1. The image data is sent to a bus line from an output buffer and then transmitted to a computer system via the bus line. The above described circuits, which constitute an image sensing apparatus, are formed as integrated circuits and provided on a circuit board. The circuits are connected one another by wiring.

It has been proposed to manufacture a 3-chip image sensing apparatus which has a chip including an output buffer, the timing controller 3, the signal processor 4 and the A/D converter, a one-chip CCD 1 and a one-chip driver 2. In general, the digital-operating timing controller 3 and the digital-operating A/D converter 5 consist of MOS transistors, while the chiefly analog-operating signal processor 4 consists of bipolar transistors. This means that MOS transistors and bipolar transistors have to be formed on a single substrate to manufacture a one-chip device having the output buffer, the timing controller 3, the signal processor 4 and the A/D converter 5 thereon.

However, forming MOS transistors and bipolar transistors on a single substrate requires such a complicated procedure that normally all the circuits on the board are formed with MOS transistors. That is, the signal processor 4 is constituted by MOS transistors that are made to analog-operate. The signal processor 4 is integrated on a single semiconductor substrate with the timing controller 3, the A/D converter 5 and the output buffer, which are constituted by digital-operating MOS transistors.

An analog-operating MOS transistor has a better characteristic when it is constituted by an N channel-type transistor, in which electrons have great mobility in the channel area. In this case, the N-channel type MOS transistor needs to be formed in an electrically isolated P type diffusion area (P-well area). A substrate of N-type conductivity is generally utilized for this purpose. This allows the source of the MOS transistor to be short-circuited to the substrate for preventing back gate bias effect.

The signal processor 4, which receives signals from the CCD 1, is generally driven by a supply voltage of 5 V for a wider input dynamic range, while the bus line for transmitting image data is preferably driven by a supply voltage of 3.3 V for reducing the consumed power. One method for driving the bus line by a supply voltage of 3.3 V is to mount the signal processor 4 and the A/D converter 5 on a single chip and to output image data having a peak value of 5 V. This requires a level converter between the output buffer and the bus line.

Mounting the signal processor 4, the A/D converter 5 and the output buffer on a single chip eliminates the necessity of the level converter. It also enables outputting of image data with a peak value of 3.3 V by driving the chip with two separate supply voltages, for example, by driving the signal processor with a supply voltage of 5 V and driving the output buffer with a supply voltage of 3.3 V. Semiconductor substrates of N type conductivity are suitable for forming analog-operating MOS transistors. However, since supply voltage is applied to the substrate, a semiconductor substrate of N-type conductivity cannot have a plurality of different supply voltages. Thus, an integrated circuit device including the signal processor 4, timing controller 3 and the output buffer, which are mounted on a single chip, cannot be driven by two different supply voltages.

SUMMARY OF THE INVENTION

Accordingly, it is an objective of the present invention to enable outputting of image data adaptive for a bus line while securing input dynamic range of a signal processor when a signal processor and an output buffer are integrated on an N-type semiconductor substrate.

To achieve the above objective, an image sensing apparatus according to the present invention senses the image of a subject screen by screen and outputs the image information to a bus line as digitized data. The image sensing apparatus includes a solid state image sensor. The sensor has a plurality of light-receiving elements aligned in a matrix form and stores information charges element by element produced by the individual light-receiving elements in response to the received light. A driver provides the solid state image sensor with a clock pulse. The information charges stored in the individual light receiving elements are sequentially outputted from the solid state image sensor in response to the clock pulse. A signal processor receives the information charges output from the image sensor and produces image signals in a predetermined format. An A/D converter quantizes the image signals produced in the signal processor and produces image data corresponding to each light receiving element of the image sensor. An output interface inputs the image data produced by the A/D converter and outputs the data to the bus line. The output interface operates between a supply voltage and a first ground voltage. The solid state image sensor and the signal processor operate between the supply voltage and a second ground voltage. The second ground voltage has a lower potential than the first ground voltage.

The above design differentiates the substantial operating voltage of the signal processor from the operating voltage of the output interface on a semiconductor substrate of N-type conductivity, on which the signal processor, the A/D converter and the output interface are integrated. This allows the image data having a peak value corresponding to the operating voltage of the bus line to be directly outputted from the output interface.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
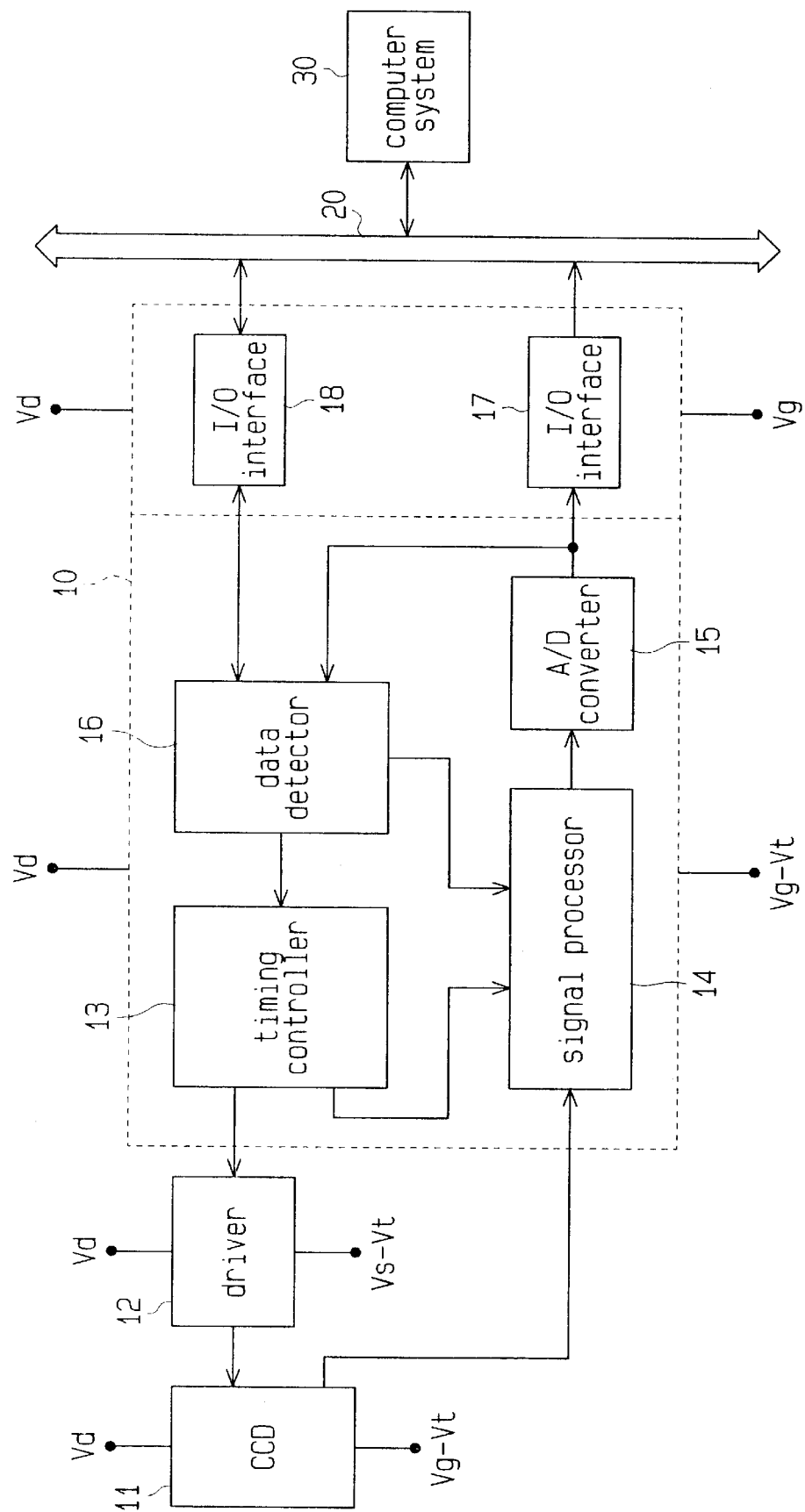
FIG. 1 is a block diagram of an image sensing apparatus according to an embodiment of the present invention.
Figure 3:
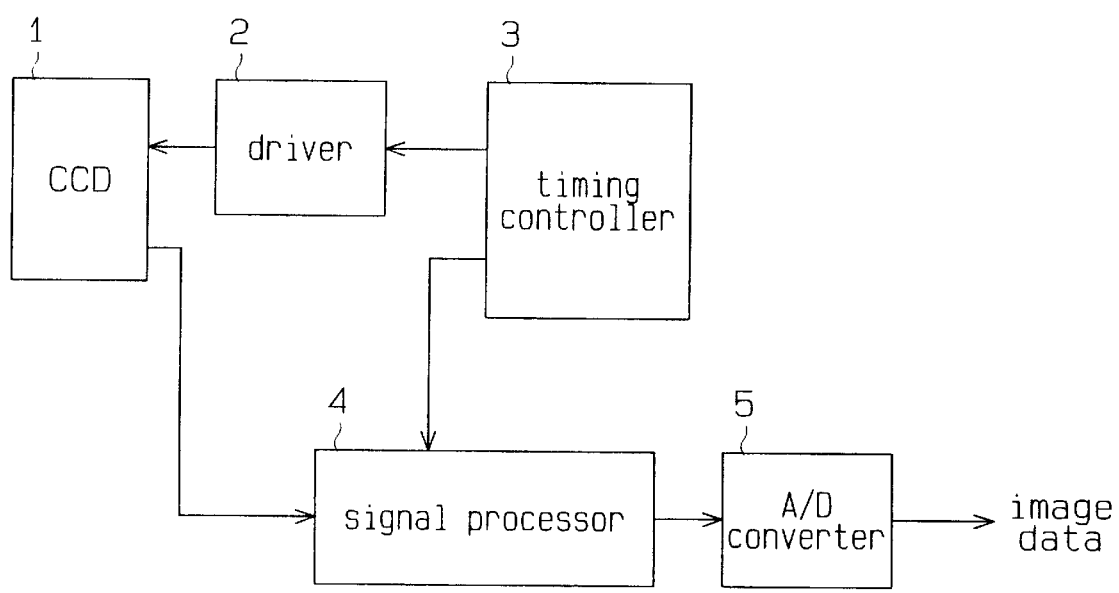
FIG. 3 is a block diagram of a conventional image sensing apparatus.

FIG. 1 is a block diagram showing an image sensing apparatus according to the present invention. A solid state image sensor 11 is constituted by a CCD (charge coupled device) having a plurality of light-receiving elements aligned in a matrix form and a plurality of shift registers corresponding to each light-receiving element. A CCD driver 12 produces a multi-phase clock pulse signal based on horizontal and vertical scan timings. The CCD driver 12 drives the CCD 11 with the multi-phase clock pulse signal. The CCD 11 and the driver 12 have the same structures as those in FIG. 3. Information charges are stored in each light-receiving element and converted to a voltage value. Then, the charges are sequentially outputted as image signals. The CCD 11 and the driver 12 are two independent integrated circuits. A supply voltage Vd and a voltage Vg-Vt are applied to the CCD 11. The voltage Vg-Vt is lower than the supply voltage Vg by the amount of voltage Vt. The supply voltage Vd and a voltage Vs-Vt are applied to the driver 12. The voltage Vs-Vt is lower than a ground voltage Vs (Vs<Vg), which is set for the driver 12, by the amount of voltage Vt.

A timing controller/signal processing unit 10 includes a timing controller 13, signal processor 14, A/D converter 15, data detector 16 and a pair of input-output interfaces 17 and 18. The timing controller 13 includes a counter and a decoder and produces timing signals of horizontal or vertical scan period in accordance with a reference clock having a given period. The timing controller 13 also controls the image sensing operation mode and the accumulation time of charges of the CCD 11.

The signal processor 14 shapes image signals from the CCD 11 into a predetermined format by performing a sample and hold operation, AGC (automatic gain control), etc. to the signals. The A/D converter 15 quantizes the image signals from the signal processor 14 pixel by pixel for producing digitized image data corresponding to each light-receiving element on the CCD 11. The signal processor 14 and the A/D converter 15 have the same function as the signal processor 4 and the A/D converter 5 in FIG. 3.

The data detector 16 receives the image data from the A/D converter 15 and integrates the inputted data at every predetermined period. The data detector 16 then instructs the signal processor 14 to perform the AGC (automatic gain control). In other words, the data detector 16 computes the average level of the image data by integrating the image data and performs feedback control to the signal processor 14 to set the average level within a predetermined range. In response to control signals from the timing controller 13, the data detector 16 instructs the CCD 11 to change the image sensing operation mode and the accumulation time of charges. These instructions are based on the information from an input-output interface 18, which will be described later, via the bus line 20 and on the above described integrated value of the image data.

A first input-output interface 17 receives the image data produced by the A/D converter 15 and outputs the data to the bus line 20. A second input-output interface 18 receives control information from a host computer system 30 via the bus line 20 and outputs the information to the data detector 16. The bus line 20 connects the image sensing apparatus with the computer system 30. The image data outputted from the image sensing apparatus is transmitted to the computer 30 via the bus line 20. The computer 30 sends the control information for determining image sensing condition to the apparatus via the bus line 20.

The timing controller 13, the signal processor 14, the A/D converter 15, the data detector 16 and the input-output interfaces 17 and 18 are integrated on a semiconductor substrate of N-type conductivity. The timing controller/signal processing unit 10 is formed as a single integrated circuit. A common supply voltage Vd is applied to the timing controller 13, the signal processor 14, the A/D converter 15, the data detector 16 and the input-out interfaces 17 and 18. A voltage Vg-Vt is applied to the timing controller 13, the signal processor 14, the A/D converter 15 and the data detector 16. The voltage Vg-Vt is lower than the ground voltage Vg by the amount of voltage Vt. The ground voltage Vg is applied to the input-output interfaces 17 and 18. In the timing controller/signal processing unit 10 constituted by a semiconductor substrate, on which the components 13 to 18 are integrated, the common supply voltage Vd is applied to the substrate. Two different voltages Vg–Vt and Vg are applied to each component with separate wires. Vt is equal to the difference between the drive voltage of the signal processor 14 and that of the bus line 20.

For example, if the signal processor 14 is driven within an operating range of 5 V and the bus line 20 is driven within an operating range of 3.3 V, Vt is set at 1.7 V. If the supply voltage is 3.3 V and the ground voltage is 0 V, the timing controller 13, the signal processor 14, the A/D converter 15 and the data detector 16 operate within the range from –1.7 V to 3.3 V (an operating range of 5 V). Since the input-output interface 17 is driven by the supply voltage of 3.3 V, an image data having the peak level of 3.3 V is outputted to the bus line 20, even when the peak level of the image data from the A/D converter 15 is 5 V. This allows the timing controller/signal processing unit 10 to be directly coupled to the bus line 20.

Figure 2:
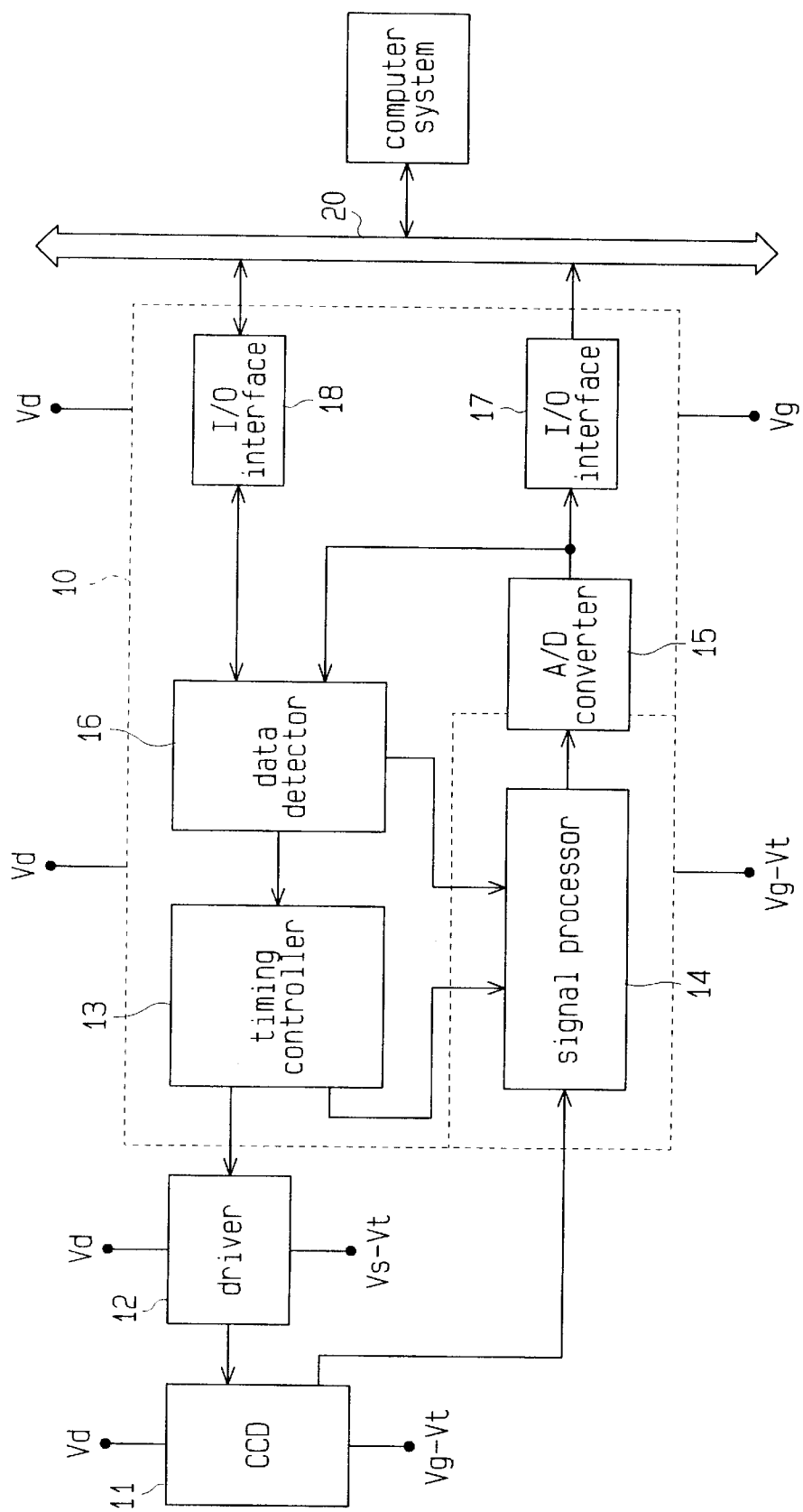
FIG. 2 is a block diagram of an image sensing apparatus according to another embodiment of the present invention.

FIG. 2 is a block diagram illustrating another embodiment of the present invention.

In this embodiment, the assigning of the two voltages Vg–Vt and Vg in the timing controller/signal processing unit 10 is different from the first embodiment illustrated in FIG. 1. That is, in this embodiment, the voltage Vg–Vt is applied only to the input side of the A/D converter 15 and the signal processor 14. The ground voltage Vg, which is applied to the input-output interface 17 and 18 in the first embodiment, is applied to the rest of components.

For example, like in the first embodiment illustrated in FIG. 1, if the supply voltage Vd is set at 3.3 V, ground voltage is set at 0 V and the Vt is set at 1.7 V, the drive voltage of the signal processor 14 and the reference voltage of the A/D converter 15 are set at 5 V. The drive voltage of the other components is set at 3.3 V. Setting the drive voltage of the timing controller 13 and the data detector 16 low as described above reduces the consumed power of the timing controller/signal processing unit 10. The transistors in the driver 12 and the signal processor 14 operate based on timing signals from the timing controller 13. The peak value of the timing signals from the timing controller 13 becomes 3.3 V. The problems caused by this peak value may be practically eliminated by setting the threshold level of the transistors in the driver 12 and the signal processor 14 at the same level as the peak value.

The voltages applied to the timing controller/signal processing unit 10 are not limited as described in the above embodiments since the present invention only requires that the drive voltage of the signal processor 14 be higher than the drive voltage of the input-output interfaces 17 and 18.

The present invention partially differentiates the drive voltage in a timing controller/signal processing unit formed on a semiconductor substrate of an N-type conductivity. The present invention obtains image data having a peak value adaptive to the bus line while keeping wide the input dynamic range of the signal processor, which receives the image signals from the CCD. Thus, the timing controller/signal processing unit may be directly coupled to the bus line without a level converter in between. This reduces the number of components that constitute the image sensing apparatus. Since only the range of the drive voltage is shifted in the present invention, a conventional CCD and a conventional driver without any special design may be incorporated in the apparatus of the present invention.

Therefore, the present examples and embodiments are to be considered as illustrative and not restrictive and the invention is not to be limited to the details given herein, but may be modified within the scope of the appended claims.

What is claimed is:

1. An image sensing apparatus for sensing an object and for transmitting the image information to a bus line as digitized data, comprising:

a solid state image sensor having a plurality of light-receiving elements aligned in a matrix form, said solid state image sensor storing information charges element by element produced by each light-receiving element in response to received light;

a driver for providing said solid state image sensor with a clock pulse, said driver causing said solid state image sensor to sequentially output said information charges stored in said individual light-receiving elements in accordance with said clock pulse;

a signal processor for producing image signals in a predetermined format in response to said information charges output from said solid state image sensor;

an A/D converter for quantizing the image signals produced in said signal processor, said A/D converter producing image data corresponding to each light receiving element of said solid state image sensor;

an output interface for outputting the image data produced by said A/D converter to said bus line; and said output interface operating between a supply voltage and a first ground voltage, said solid state image sensor and said signal processor operating between said supply voltage and a second ground voltage, wherein the second ground voltage has a lower potential than said first ground voltage.

2. The image sensing apparatus according to claim 1, wherein said signal processor and said A/D converter, together with said output interface, are integrated on an N-type semiconductor substrate.

3. The image sensing apparatus according to claim 2, wherein said supply voltage is applied to said substrate, said first ground voltage and said second ground voltage are applied to each component with separated wires.

4. The image sensing apparatus according to claim 1, further comprising a timing controller for producing timing signals to control said driver, and a data detector for detecting an average level of image signals produced in said signal processor or image data received from said A/D converter, said data detector performing feedback control to said signal processor for setting the average level within an appropriate range.

5. The image sensing apparatus according to claim 4, wherein said timing controller, said data detector and said output interface, together with said signal processor and said A/D converter, are integrated on said N-type semiconductor substrate.

6. An image sensing apparatus for sensing an object and for transmitting the image information to a bus line as digitized data, comprising:

a solid state image sensor having a plurality of light-receiving elements aligned in a matrix form, said solid state image sensor storing information charges element by element produced by each light-receiving element in response to received light;

a driver for providing said solid state image sensor with a clock pulse, said driver causing said solid state image sensor to sequentially output said information charges stored in said individual light-receiving elements in accordance with said clock pulse;

a timing controller for producing timing signals for controlling said driver;

a signal processor for producing image signals in a predetermined format in response to said information charges output from said solid state image sensor;

an A/D converter for quantizing the image signals produced in said signal processor, said A/D converter producing image data corresponding to each light receiving element of said solid state image sensor;

an output interface for outputting the image data produced by said A/D converter to said bus line;

a data detector for detecting an average level of image signal produced in said signal processor or image data received from said A/D converter, said data detector performing feedback control to said signal processor for setting the average level within an appropriate range;

an input interface for receiving control information provided from a computer system unit coupled to said bus line, said input interface outputting said control information to said data detector; and said input interface and said output interface operating between a supply voltage and a first ground voltage, said solid state image sensor and said signal processor operating between said supply voltage and a second ground voltage, wherein the second ground voltage has a lower potential than said first ground voltage.

7. The image sensing apparatus according to claim 6, wherein said timing controller, said signal processor, said A/D converter, said data detector, said output interface and said input interface are integrated on an N-type semiconductor substrate.

8. The image sensing apparatus according to claim 7, wherein said supply voltage is applied to said substrate, said first ground voltage and said second ground voltage are applied to each component with separated wires.

* * * * *